United States Patent
Bridier et al.

(10) Patent No.: US 7,156,606 B2
(45) Date of Patent: Jan. 2, 2007

(54) ARTICLE ALIGNING APPARATUS

(75) Inventors: Patrice Bridier, Mers-sur-Indre (FR);
Alain Vergnaud, Cere (FR); Marc Bernoin, Mezieres-en-Brenne (FR)

(73) Assignee: MeadWestvaco Packaging Systems, LLC, Glen Allen, VA (US)

( * ) Notice: Subject to any disclaimer, the term of this patent is extended or adjusted under 35 U.S.C. 154(b) by 0 days.

(21) Appl. No.: 11/150,713

(22) Filed: Jun. 10, 2005

(65) Prior Publication Data

US 2005/0274091 A1    Dec. 15, 2005

Related U.S. Application Data

(63) Continuation of application No. PCT/US2003/039680, filed on Dec. 11, 2003.

(30) Foreign Application Priority Data

Dec. 11, 2002    (GB) .................................. 0228902.3

(51) Int. Cl.
*B65G 57/00*    (2006.01)
(52) U.S. Cl. .................. 414/789.6; 198/447; 198/575; 198/699.1
(58) Field of Classification Search ............. 414/789.6, 414/794.4; 198/447, 448, 575, 699.1
See application file for complete search history.

(56) References Cited

U.S. PATENT DOCUMENTS

| | | | |
|---|---|---|---|
| 3,596,747 A | | 8/1971 | Beckius et al. |
| 3,785,508 A | * | 1/1974 | Haydan .................... 414/789.6 |
| 3,978,571 A | * | 9/1976 | Orlando et al. ................ 29/730 |
| 4,195,737 A | * | 4/1980 | Rysti .......................... 209/521 |
| 4,381,596 A | * | 5/1983 | Simonton et al. .......... 29/623.1 |
| 4,413,462 A | | 11/1983 | Rose |
| 4,450,949 A | | 5/1984 | Buschor et al. |
| 4,887,414 A | * | 12/1989 | Arena ......................... 53/543 |
| 5,092,448 A | * | 3/1992 | Cinotti .................... 198/418.4 |
| 5,161,665 A | * | 11/1992 | Cragun ...................... 198/448 |
| 5,269,646 A | * | 12/1993 | Focke ..................... 414/796.2 |
| 5,482,427 A | * | 1/1996 | Olson ..................... 414/789.6 |
| 5,605,433 A | * | 2/1997 | Tanaka .................... 414/793.4 |
| 5,765,336 A | | 6/1998 | Humbert et al. |
| 5,913,656 A | * | 6/1999 | Collins ....................... 414/801 |
| 5,961,274 A | * | 10/1999 | Bors .......................... 414/791 |
| 6,145,281 A | * | 11/2000 | Hansen et al. ................ 53/447 |

FOREIGN PATENT DOCUMENTS

| | | |
|---|---|---|
| EP | 0 865 988 A | 9/1998 |
| FR | 2 272 897 A | 12/1976 |
| WO | WO 94/20369 A1 | 9/1994 |

\* cited by examiner

*Primary Examiner*—Douglas A. Hess
(74) *Attorney, Agent, or Firm*—Tsugihiko Suzuki

(57) ABSTRACT

An article aligning apparatus for aligning a plurality article tiers to be loaded into a carton. Each article tier comprises an article array delivered from an in-feed stream at an in-feed end of a packaging machine. The apparatus comprises an article conveyor for conveying a lower article tier, a first article conveying means including one or more lugs mounted on an endless track for selecting an upper article tear and for conveying the upper article tier to a point of vertical alignment with the lower article tier, thereafter to be stacked and conveyed to the out feed end of the apparatus.

20 Claims, 2 Drawing Sheets

ARTICLE ALIGNING APPARATUS

This is a continuation of international application No. PCT/US2003/039680, filed Dec. 11, 2003, which is hereby incorporated by reference.

BACKGROUND OF THE INVENTION

This invention relates to packaging of primary articles such as so-called brick packages or interconnected cups or pots in multiple packaged cartons and is more particularly concerned with feeding articles from an in-feed stream and for initiating and then completing a loading operation of articles in a multiple tier carton.

A majority of known packaging machines are dedicated machines, which construct only one type of carton. Therefore, modern bottling plants are required to use a plurality of packaging machines to package different carton types, each machine taking up considerable floor space and being expensive to both purchase and operate.

A limited number of packaging machines are capable of packaging different sizes of one carton, for example, six, eight or twelve bottles of a wraparound carton. All such machines require adjustment when switching from one size or type of carton to another. This adjustment includes the manual removal of all of the cartons within the packaging machine and possibly the mechanical adjustment of components in the machine. During this changeover period, which can be thirty minutes or more, a machine cannot be used (known as "downtime"), which is an expensive delay in a bottling plant. Such a delay may even result in downtime for the entire bottling line, not just the packaging machine, if problems arise during the changeover procedure.

It is envisaged that the present invention can be used in various types of packaging machine. Alternatively, the aligning apparatus of the present invention can be sold as an individual module to be fitted to new equipment or to existing equipment on a retro fit basis.

More particularly, this invention relates to a mechanism for aligning a plurality of rows of articles from an in-feed stream at an in-feed end of a packaging machine and is particularly useful for grouping together a plurality of bottles or connected pots in a multiple packaging machine.

In a known mechanism, each tier of articles is selected and aligned at the same time by means of a star wheel feeder. The star wheel feeder comprises two opposed star wheel mechanisms; each mechanism having a star wheel corresponding to a tier. Thus for a three tier pack, each mechanism has three star wheels mounted on a common shaft and adapted to the rotated in unison. Each tier of articles is fed to the star wheel and a backpressure applied to the articles to ensure a continuous flow. Each star wheel selects a particular article in the same relative position for each array and moves each array forward so that each tier is aligned. Thus, the star wheel assembly selects and aligns in one operation.

One problem with this approach is that the speed of the star wheel assembly increases so does the likelihood that the article selection part of the process is not carried out properly and the wrong article from the array is selected, which results in the misalignment of the tiers. One consequence of this problem is that a packaging machine throughput is dictated by the speed of the star wheel assembly, which is undesirable.

SUMMARY OF THE INVENTION

The present invention seeks to overcome the commercial disadvantages of known packaging machines by providing a grouping mechanism, which is able to group articles for loading into more than one type of carton. Further, the invention is capable of switching from one configuration of grouped articles to another for loading into different carton types or sizes with minimum downtime. Further, the modular nature of the present invention enables a "fully flexible" machine to be constructed, which overcomes, or at least mitigates, the problems of known machines.

One aspect of the invention provides an article aligning apparatus for aligning a plurality article tiers to be loaded into a carton, each article tier comprising an article array delivered from an in-feed stream at an in-feed end of a packaging machine, which apparatus comprises an article conveyor for conveying a lower article tier, a first article conveying means including one or more lugs mounted on an endless track for selecting an upper article tear and for conveying the upper article tier to a point of vertical alignment with the lower article tier, thereafter to be stacked and conveyed to the out feed end of the apparatus.

Preferably, there further comprises a second article conveying means including one or more lugs mounted on an endless track for conveying an article from the third tier and for conveying the article of array to be aligned for the first and second article tiers at the alignment point. Optionally, the lugs from the first article conveying means and second article conveying means are driven by drive means to bring their respective article tiers into alignment with the lower most article tier.

There may further comprise control means to control the speed of the or each lug on the first and, as the case may be, second article conveying means to control the number of articles in each grouping and the position of alignment between adjacent tiers. The control means may receive information regarding the speed of each article tier at the in-feed end of the article conveying means.

Optionally, control means comprises a manual input means.

In some embodiments, the control means comprises a sensor arranged to measure the speed of articles at the in-feed end of the article conveying means, and/or the speed of the lower article tier at the in-feed end of the article conveying means, and/or the speed of said lug or lugs.

The control means may vary the speed of the lug or lugs to lie within the range plus or minus 1–30% of the speed of the articles at the in-feed end of the article conveying means.

A second aspect provides a controller for controlling the speed of a lug in such an apparatus, the controller comprising a central processor, a manual input means, and separate means controlled by said central processor for individually positioning and/or relocating the or each lug and the endless track.

A third aspect of the invention provides a method of metering articles into groupings having a predetermined pitch comprising the steps of: continuously feeding the articles of a first and second article tiers into the in-feed end of an article conveyor at a known rate; synchronizing a lug such that it is interposed between the articles downstream thereof so as to select the article tier; conveying the lug and each article tier to a pre-determined position to be aligned therewith.

BRIEF DESCRIPTION OF THE DRAWINGS

Exemplary embodiments of the invention will now be described by way of example only, with reference to the accompanying drawings in which.

DETAILED DESCRIPTION OF THE PREFERRED EMBODIMENTS

Figure 1:
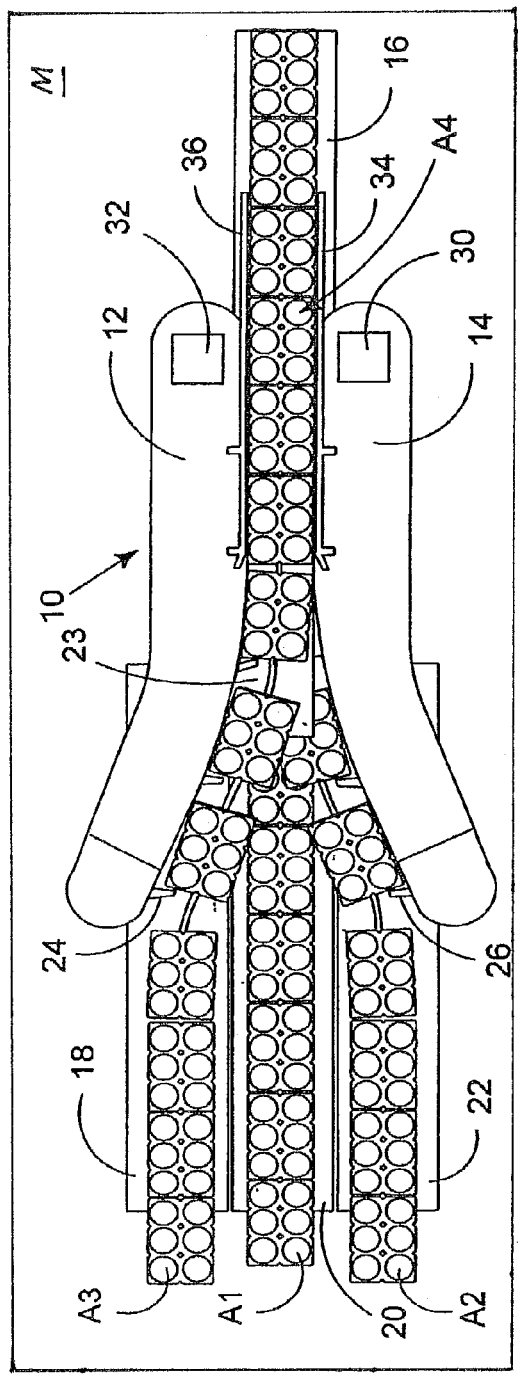
FIG. 1 is a top plan view of the aligning apparatus according to an embodiment of the invention.

Referring to the drawings, there is shown an article aligning apparatus for selecting and aligning at least one article tier from a plurality of in-feed streams of article tier. Each in-feed stream supplies one tier of a multi tiered group of articles ready to be packaged into an outer carton.

Referring first to FIG. 1, there is shown three in-feed streams A1, A2, A3 on each of which there is supplied an array of connected pots, for example six arranged in two by three arrangement. Each in-feed stream A1, A2, A3 is supplied by article conveyors 20, 22 and 18.

The central article conveyor 20 supplies the lowest tier of articles A1. Conveyor 22 supplies an intermediate tier of articles A2 and conveyor 18 supplies the upper tier of articles A3. The intermediate and upper in-feed conveyors 18, 20 and 22 can be raised or lowered by suitable known devices so as to be able to convey articles with a different height. Thus, the machine M is able to package a variety of article types.

The lowest article arrays A1 are conveyed into the article aligning apparatus 10 and continue on the same path through the apparatus to the out-feed conveyor 16. The central in-feed stream A1 is continuously supplied with article arrays in abutment with the adjacent arrays due to the forward pressure applied to the stream.

In order to align the intermediate and upper article tiers A2, A3 with the lowermost tier A1, the aligning apparatus is provided with a pair of side lug assemblies 12, 14 supplied on opposed sides of the central article stream A1. Each lug assembly 12, 14 is provided with a plurality of lugs 24, 26 mounted on an endless chain which in turn is powered by suitable drive means 32, 30, for example servo motor.

The intermediate tier A2 is fed from the in-feed conveyor 22 to an aligning position P (FIG. 2) in the apparatus by the lug assembly 14. Thus, an array A2 arrives upstream of the lug assembly 14 and an article of that array is engaged by the lug 26, shown in FIG. 1, so that the article array is selected upstream (at point S in FIG. 2) of the point of alignment P. The article array A2 is moved forward by the lug 26 and into co-planar arrangement with the central array A1. In some embodiments, the intermediate array A2 is supported on the underside by a suitable support means for example a plate 21. As the lug 26 continues to move forward, it moves the intermediate array A2 into vertical alignment with the lowermost array A1 so that at the front end of the base plate 21, the array A2 is placed directly on to the lowermost array A1 in an aligned position.

By moving the article selection point S upstream of the alignment point P, the throughput speeds of this operation can be improved because the selection process is more accurate.

Figure 2:
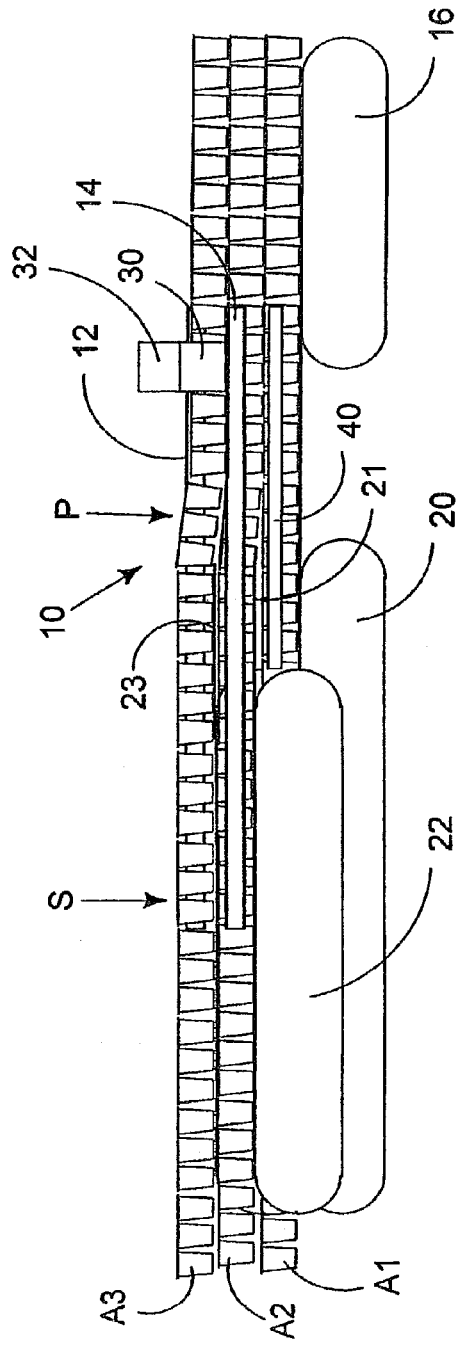
FIG. 2 is a side elevation view of the article alignment apparatus shown in FIG. 1.
Figure 3:
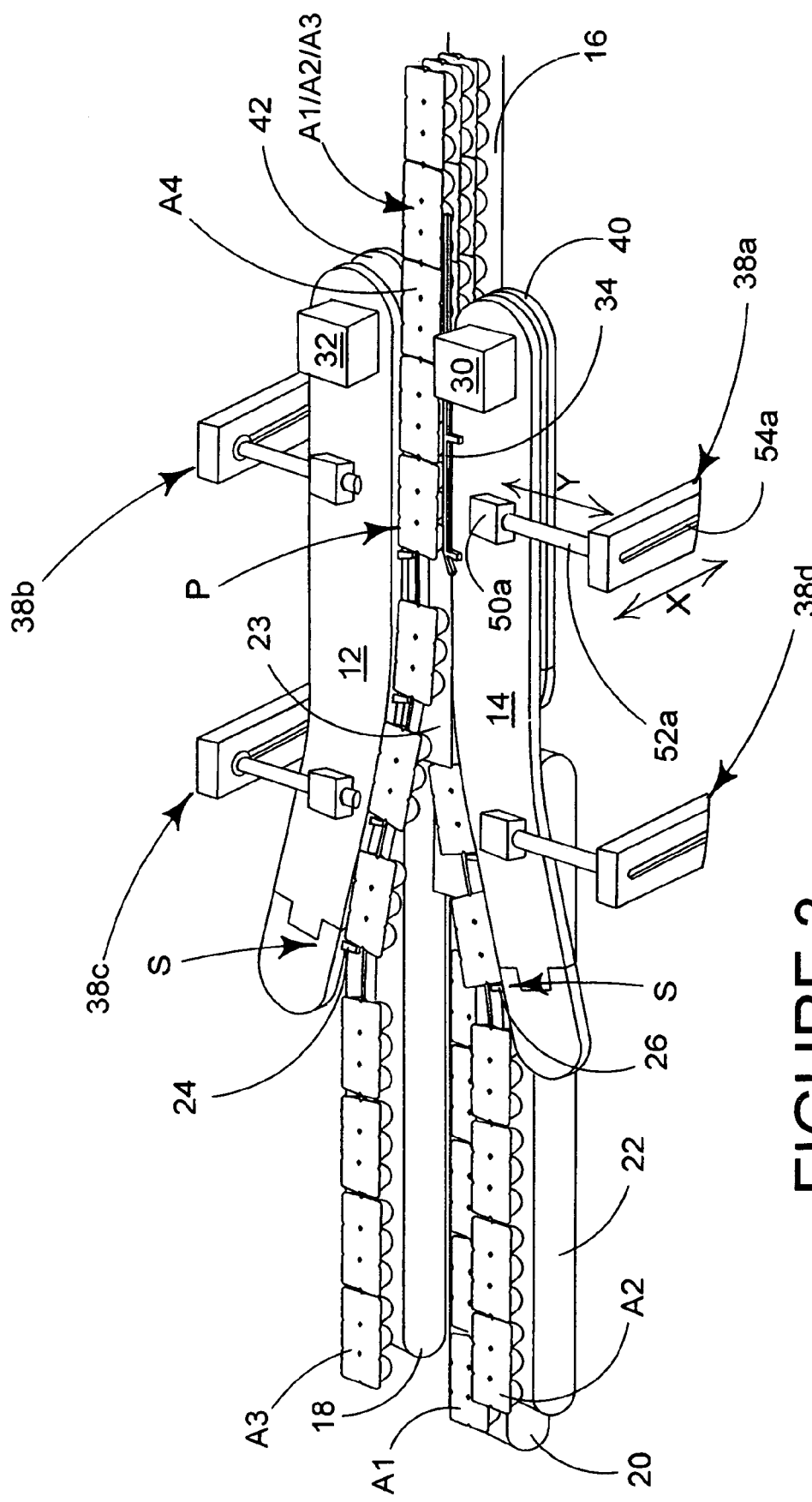
FIG. 3 is perspective view of the article aligning apparatus shown in FIGS. 1 and 2.

In those embodiments with a third (or upper) tier, for example as shown in FIGS. 1 and 2, the upper tier A3 is fed from the in-feed conveyor 18 to the aligning position P (FIG. 2) in the apparatus by the lug assembly 12. Thus, an array A3 arrives upstream of the lug assembly 12 and an article of that array is engaged by the lug 24, shown in FIG. 1, so that the article array is selected upstream (at point S in FIG. 2) of the point of alignment P. The article array A3 is moved forward by the lug 24 and into co-planar arrangement with the central array A1. In some embodiments, the upper array A3 is supported on the underside by a suitable support means for example a plate 23. As the lug 24 continues to move forward, it moves the upper array A3 into vertical alignment with the lowermost array A1, and intermediate array A2 so that at the front end of the base plate 23, the array A3 is placed directly on to the intermediate array A2 in an aligned position.

In a preferred embodiment, forward movement of the lowest array A1 is controlled by a lug assembly 40, which in turn moves the multi tiered articles from the alignment point P to the out-feed end. Optionally fixed guides 34, 36 offer lateral support to the aligned grouping A4.

In order to align different article sizes, the lug assemblies 12, 14 can be moved in the 'X' and 'Y' planes, such that each assembly 12, 14 is connected to a frame 38a to 38d. Each frame is identical so only frame 38a will be described in any greater detail. Frame 38a comprises a connection device 50a connected to a moveable shaft 52a, which is moveable in both planes in a vertical slot 54a.

It is envisaged that the apparatus may be controlled by a suitable controller. The controller may be a dedicated processor or may be control means for a packaging machine M with which the apparatus of the invention is used. Alternatively, the controller may preferably be a known programmable servo control system.

The controller has a central processor; a manual input means through which specific instructions can be programmed, and optionally, a display, which indicates useful information to the machine operator. The central processor and the display can display operational information such as the speed of operation of the machine M and its compliance with particular safety requirements, in the normal manner.

The controller controls the positions of the moveable components as well as the speed of movement of variable speed components. For example, the central processor controls the motors 30, 32 that power the lug assemblies 12, 14 40, which move articles to be packed, so that the position and speed of each tier is known and can be adjusted to maintain accurate alignment.

Data regarding the in-feed rate of articles A1, A2, A3, the dimensions of the articles, the required number of articles in each grouping and the spacing of the lugs is input into the controller. The data may be input manually or may be supplied by one or more sensors (not shown) provided on the in-feed stream of the articles and the endless chain. Taking this data, the controller computes the relative positions of the articles at the in-feed end of the article conveyor means. The controller then signals the drive means driving the apparatus to increase or decrease the downstream velocity of lug assemblies 12, 14 40 in order that the correct point of interposition can be achieved.

The control means is preferably capable of varying the speed of the lugs in the range plus or minus 1–30% of the speed of the articles at the aligning position.

If the device is switched regularly between a number of standard groupings and pitches, information regarding the dimensions of articles, and the spacing of the lugs preferably stored in memory associated with the controller to speed changeover between different configurations.

It will be recognized that as used herein the terms "top", "bottom" and "side" with respect to the device are relative terms, and that the device may be re-orientated as necessary or as desired.

Whilst the preferred embodiment described herein is for loading article arrays, it will be recognized that the invention is not limited to such pots. The invention may be used with machines for packaging, cans, bottles, and paperboard bricks into cartons.

The aligning apparatus of the present invention may be sold as an integral part of a packaging machine M. Alternatively, the device may be sold as an individual module to be fitted to new equipment or existing equipment on a retrofit basis.

Numerous changes may be made within the scope of the present invention, for example for mechanism for deploying the lugs may be substituted for some form of hydraulic or pneumatic actuators, the design of the lug assemblies may be adjusted for different article types.

What is claimed is:

1. An apparatus for stacking articles for subsequent packing together as stacked tiers in a carton, said apparatus comprising:
   conveying means for conveying separate streams of articles through a working reach of the apparatus such that movement of the articles in their separate streams is synchronized;
   means for simultaneously causing the articles of one stream to be tiered and aligned relative to the articles in each other stream within said working reach such that subsequent stacking of the articles is facilitated; and
   control means to control the speed of one or more lugs on said conveying means to control the number of articles in each grouping and the position of alignment between adjacent tiers;
   wherein in said control means receives information regarding the speed of each article tier upstream from an in-feed end of said conveying means.

2. The apparatus as claimed in claim 1 wherein said one or more lugs on said conveying means are mounted on an endless track.

3. The apparatus as claimed in claim 2 wherein said one or more lugs from said conveying means are driven by drive means to bring their respective article tiers into alignment with the lower most article tier.

4. A controller for controlling the speed of a lug in the apparatus as claimed in claim 2, wherein said controller comprises a central processor, a manual input means, and separate means controlled by said central processor for individually positioning and/or relocating said one or more lugs and said endless track.

5. The controller as claimed in claim 4 for use with a packaging machine having an article feed means in the form of a plurality of lug assemblies, said controller controlling the speed of rotation of said lug assemblies.

6. The controller as claimed in claim 4 wherein the relative positions and state of motion of each of movable components of the machine is sensed using individual sensors and transmitted to the controller.

7. The apparatus as claimed in claim 1 wherein said control means comprises a sensor arranged to measure the speed of articles upstream from the in-feed end of the article conveying means.

8. The apparatus as claimed in claim 1 wherein said control means comprises a sensor to measure the speed of said one or more lugs.

9. The apparatus as claimed in claim 1, wherein said control means varies the speed of said one or more lugs to lie within the range plus or minus 1–30% of the speed of the articles at the in-feed end of said conveying means.

10. A method of stacking articles for subsequent packing together as stacked tiers in a carton, said method comprising:
    conveying separate streams of articles by means of one or more lugs mounted on an endless track through a working reach of an article stacking machine such that movement of the articles in their separate streams is synchronized; and
    simultaneously causing the articles of one stream to be tiered and aligned relative to the articles in each other stream within the working reach such that subsequent stacking of the articles is facilitated;
    wherein the speed of at least some of the articles prior to the beginning of said conveying step is received by control means which controls the speed of said one or more lugs according to said speed.

11. The method as claimed in claim 10, wherein the speed of said articles is received from an input device into which the speed is entered manually.

12. An aligning apparatus for stacking articles conveyed in separate streams, said aligning apparatus comprising:
    means for selecting a first article from a first one of said streams of articles at an upstream selection point; and
    means for adjusting the speed and position of said first article to vertically align said first article with respect to a second article moving continuously in a second one of said streams;
    wherein said first one of said streams of articles moves in a first plane; and
    wherein said second one of said streams of articles moves in a second plane, said second plane being at a different elevation than said first plane.

13. The aligning apparatus of claim 12, wherein said means for selecting includes an endless track with at least one lug mounted thereto.

14. The aligning apparatus of claim 13, wherein said at least one lug moves in said second plane.

15. The aligning apparatus of claim 12, further comprising:
    means for selecting an additional article from at least one other of said streams; and
    means for adjusting the speed and position of said additional article such that said additional article is vertically aligned with respect to said first and second articles moving in said first and second streams;
    wherein each said additional article is moving in a corresponding plane that is vertically offset from each of said other planes.

16. The aligning apparatus of claim 15, further comprising:
    means for selecting said second article from said second stream; and
    means for adjusting the speed and position of said second article;
    wherein said means for adjusting the speed and position of said first article, said second article, and said additional article are synchronized to vertically align said first article, said second article, and said additional article as said first article, said second article, and said additional article move in corresponding planes.

17. The aligning apparatus of claim 12, further comprising:
    means for selecting said second article from said second stream; and means for adjusting the speed and position of said second article;

wherein said means for adjusting the speed and position of said first article and said means for selecting said second article are synchronized to vertically align said first and second articles as said first and second articles move in said first and second planes.

18. The aligning apparatus of claim 12, wherein said apparatus is vertically adjustable to accommodate a variable vertical offset distance between said first and second planes.

19. The aligning apparatus of claim 12, wherein said apparatus is horizontally adjustable within said second plane.

20. The aligning apparatus of claim 12, further comprising control means for controlling the rate at which articles are selected from said streams.

* * * * *